Sept. 29, 1931.  A. J. WEATHERHEAD, JR  1,825,034
SECTIONAL PIPE COUPLING
Filed April 13, 1927
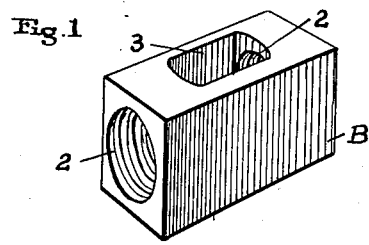
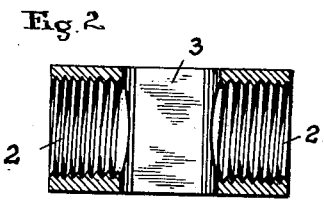
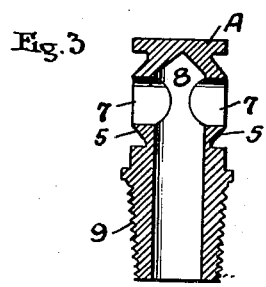
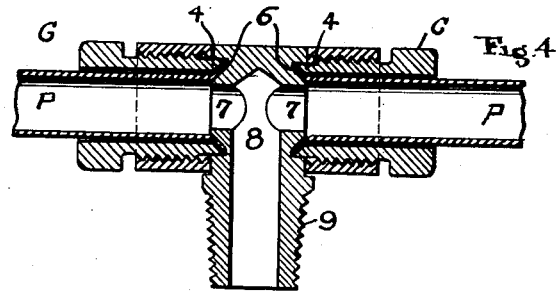
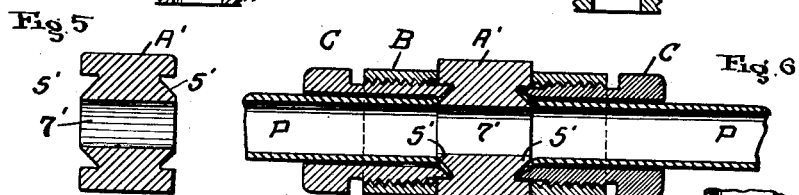
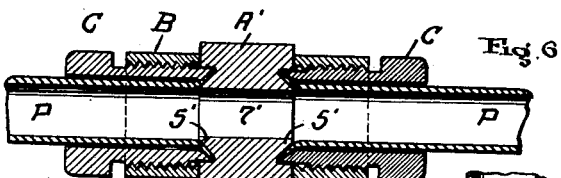
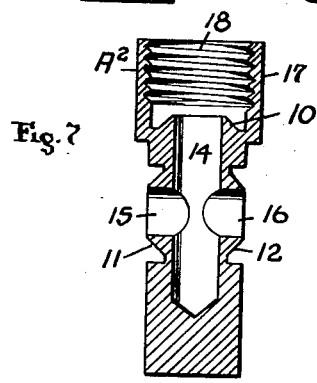
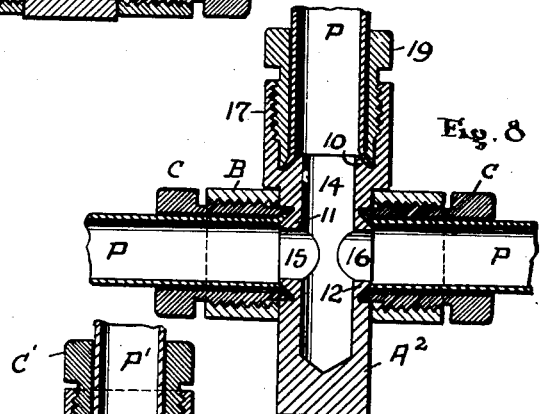
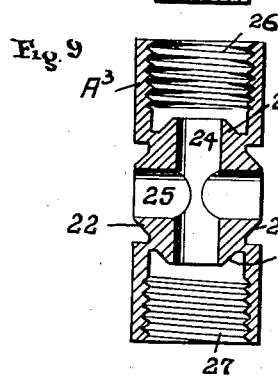
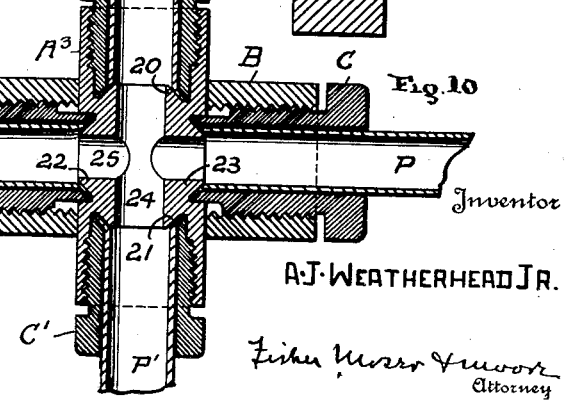
Inventor
A. J. WEATHERHEAD JR.
Fisher, Morrow & Ti...
Attorney Patented Sept. 29, 1931

1,825,034

UNITED STATES PATENT OFFICE

ALBERT J. WEATHERHEAD, JR., OF CLEVELAND, OHIO

SECTIONAL PIPE COUPLING

Application filed April 13, 1927. Serial No. 183,373.

The present invention is an improvement in the sectional pipe coupling shown and described in my companion application filed on even date herewith, Serial No. 183,372, and my present object is to provide a modified yoke member for a sectional coupling of that kind whereby a pair of pipes may be connected in axial alignment to opposite ends of the yoke member and in sealing union with a second coupling section or body member. This double yoke member may also be employed advantageously with various modified forms of body sections to produce different three or four way fittings, that is, fittings or couplings for three or four pipes as well as two pipes, all as herein shown and described and more particularly pointed out in the claims.

In the accompanying drawings, Fig. 1 is a perspective view, and Fig. 2 a sectional view, of a yoke member constructed according to the present invention. Fig. 3 is a sectional view of one form of body member which may be used with said yoke member and Fig. 4 is a sectional view of said yoke member and body member united together and to a pair of pipes to provide a T fitting. Fig. 5 is a sectional view of another form of body member, and Fig. 6 a sectional view of said body member and the yoke member united together by pipes and nuts to provide a straight fitting. Fig. 7 is a sectional view of still another form of body member, and Fig. 8 a sectional view of this member secured within a double yoke member to provide a three-way fitting. Fig. 9 is a sectional view of a body member having four sealing cones for four pipes, and Fig. 10 a sectional view of this four-way body member united to a double yoke member and four flanged pipes.

The coupling device or fitting comprises a main section or body member A, and a second section or yoke member B having screw-threaded openings 2—2 at opposite ends thereof and a flat sided transverse passage 3 centrally therein open to the inner ends of said screw-threaded openings. Yoke member B is detachably connected with body A, and a tubular nut C is adapted to enter each opening 2 in yoke member B to lock the parts together when a union with a pipe is desired. Thus nut C is of sufficient length to project its tip end 4 beyond the inner end of each opening 2 in clamping a pair of flanged pipes P—P against a pair of truncated cones or conical seats 5—5 formed within the opposite sides of main section A, and the mouth in the tip end of each nut is of flaring shape to correspond to the taper of the cone. The flaring end or flange 6 of each pipe is compressed in tight-sealing union with the body section when the engaging nut C is screwed home, thus bringing the open end of each pipe axially in line with a pair of cross ports or openings 7—7 centrally within cones 5—5, and which cross ports in this particular structure intersect a longitudinal bore or passage 8 in body A to provide a T coupling or three-way fitting, see Fig. 4. In this figure body A is shown as having an extension 9 which is screw-threaded externally to provide a three-way fitting adapted to be attached to a container or any appliance receiving or discharging a fluid.

In Fig. 5 I show a short section or body A' having only a single straight passage 7' extending through a pair of cones 5'—5' at opposite sides thereof, and in Fig. 6, I show this body A' and a yoke B sleeved together and united to two pipes P—P by means of a pair of nuts C—C to provide a straight coupling or one-way fitting.

In Fig. 7, a still different form of body member A² is delineated which comprises three truncated cones 10, 11, and 12, and three intersecting passages 14, 15, and 16, extending through said cones, respectively, whereby three separate pipes P may be united together to provide a T coupling or three-way fitting substantially as delineated in Fig. 8. Body member A² has an enlargement 17 at one end containing an enlarged screw-threaded bore 18 which is adapted to receive a tubular nut 19 and one of the flanged pipes P. Nut 19 serves to clamp the flanged end of this pipe against cone 10 at the outer end of main passage 14, thereby making a direct coupling to body member A² for this pipe. The other two pipes P—P are clamped against the side cones 11 and 12 by tubular nuts C—C entered within the opposite ends of yoke member B in the same way as in the other forms of the invention herein described, and in clamping the flanged ends of these two pipes against cones 11 and 12 the yoke member B and body A² are locked tightly together.

In Figs. 9 and 10, I show a four-way fitting, comprising the same yoke member B and two pair of nuts C—C and C'—C', together with a body member A³ having four cones 20, 21, 22, and 23, against which the flanged ends of four pipes P—P and P'—P' may be clamped by said nuts. Thus body member A³ comprises a central passage 24 extending through the end cones 20 and 21, and also a cross passage 25 extending through the side cones 22 and 23. Yoke member B is sleeved over body A³ to bring the tubular nuts C—C therein in register with the two side cones 22, and 23, and cross passage 25, in which position the yoke is fastened upon body A³ when the nuts C—C are screwed inwardly to clamp the flanged ends of their respective pipes P—P against cones 22 and 23. The remaining pipes P'—P' are clamped against cones 21 and 20 at the base of the enlarged screw-threaded openings 26 and 27 in the opposite ends of body A³, using similar tubular nuts C'—C'.

It will be noted that yoke member B permits a plurality of pipes to be clamped to a separate body member with sealing effect at the ends of the pipes while locking the yoke and body members rigidly but separably together, and that a yoke member of this type may be used with body members of different form to permit either a straight or angular pipe connection to be made therewith.

What I claim, is:

1. A sectional pipe coupling, comprising a body member having conical sealing seats on opposite sides thereof and a fluid passage open to the center of each seat, a yoke member sleeved over said body member having screw-threaded openings adapted to be placed opposite said seats, and tubular nuts extending through said screw-threaded openings adapted to clamp a pair of flanged pipes against said seats and to lock said yoke member to said body member.

2. A sectional pipe coupling, comprising a body member having a fluid passage open at a plurality of places in the sides thereof, a second member adapted to be sleeved over said body member having openings adapted to be placed opposite said open places in the sides of said body member, and means within each opening in said second member adapted to clamp the ends of a pipe in sealing union against said body member at said open places therein, while locking said body member to said second member.

3. A sectional pipe coupling, comprising two sections sleeved loosely upon each other having communicating openings when assembled, and a plurality of nuts adapted to secure separate pipes in sealing union with one of said sections under locking effect between said sections and at each sealing union of a pipe and said section.

4. A sectional pipe coupling comprising a body having a plurality of conical sealing seats angularly related to each other formed therein and a fluid passage connecting said seats, a yoke member sleeved upon said body having screw-threaded openings opposite each seat, tubular nuts within said screw-threaded openings, and flanged pipes extending through said nuts and clamped thereby against said conical seats.

5. A sectional pipe coupling, comprising a yoke member having a central passage and a plurality of screw-threaded openings extending into said passage, a body member adapted to occupy said central passage in the yoke member having a passage communicating with each opening in said yoke, means within said openings adapted to secure a pipe in clamping union against said body member, and said body member having means adapted to couple a pipe directly thereto.

In testimony whereof I affix my signature.

ALBERT J. WEATHERHEAD, Jr.